(12) United States Patent
Richard-Vitton et al.

(10) Patent No.: US 11,714,052 B2
(45) Date of Patent: Aug. 1, 2023

(54) DEVICE TO CHECK A CONFORMITY OF A MECHANICAL PART OF A VEHICLE

(71) Applicant: JTEKT EUROPE, Irigny (FR)

(72) Inventors: Emeric Richard-Vitton, Lyons (FR); Sarah Tallet-Pinet, Oullins (FR)

(73) Assignee: JTEKT EUROPE, Irigny (FR)

( * ) Notice: Subject to any disclaimer, the term of this patent is extended or adjusted under 35 U.S.C. 154(b) by 585 days.

(21) Appl. No.: 16/849,185

(22) Filed: Apr. 15, 2020

(65) Prior Publication Data

US 2020/0324809 A1    Oct. 15, 2020

(30) Foreign Application Priority Data

Apr. 15, 2019   (FR) ..................................... 19/03977

(51) Int. Cl.
*G01N 21/95* (2006.01)
*G06T 7/00* (2017.01)
*G01N 1/00* (2006.01)

(52) U.S. Cl.
CPC ........... *G01N 21/9515* (2013.01); *G01N 1/00* (2013.01); *G06T 7/0002* (2013.01)

(58) Field of Classification Search
None
See application file for complete search history.

(56) References Cited

U.S. PATENT DOCUMENTS

| 3,763,423 A | 10/1973 | Forster | |
| 2007/0181822 A1* | 8/2007 | Mazel | G01N 21/8803 250/432 R |
| 2014/0360285 A1* | 12/2014 | Barraco | G01L 3/105 73/862.333 |
| 2015/0192526 A1* | 7/2015 | Nissen | G01M 17/00 382/141 |
| 2019/0219507 A1* | 7/2019 | Diamond | G06T 5/50 |

FOREIGN PATENT DOCUMENTS

| CN | 203688462 U | 7/2014 |
| CN | 206788106 U | 12/2017 |
| EP | 2455752 A1 | 5/2012 |
| JP | H06-129997 A | 5/1994 |

OTHER PUBLICATIONS

Goebbels et al., "Automation of Surface Defect Detection and Evaluation" Mémoires et Études Scientifiques Revue de Métallurgie, May 1989, pp. 277-284.

\* cited by examiner

*Primary Examiner* — Kaitlin A Retallick
(74) *Attorney, Agent, or Firm* — Oliff PLC

(57) ABSTRACT

An installation intended to enable a conformity check of a mechanical part of a vehicle, including at least one magnetizing device, and at least one device for spraying a revealing product, wherein the installation also includes at least one device for generating at least one image by means of at least one image capture apparatus and at least one device for transmitting the at least one image on an analysis unit.

7 Claims, 3 Drawing Sheets

[Fig. 1]
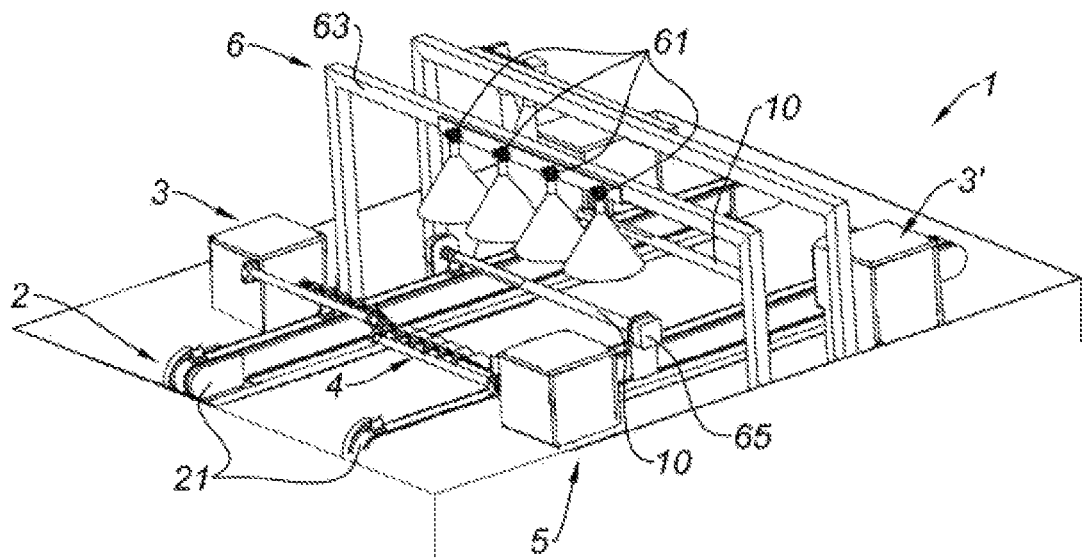
[Fig. 2]
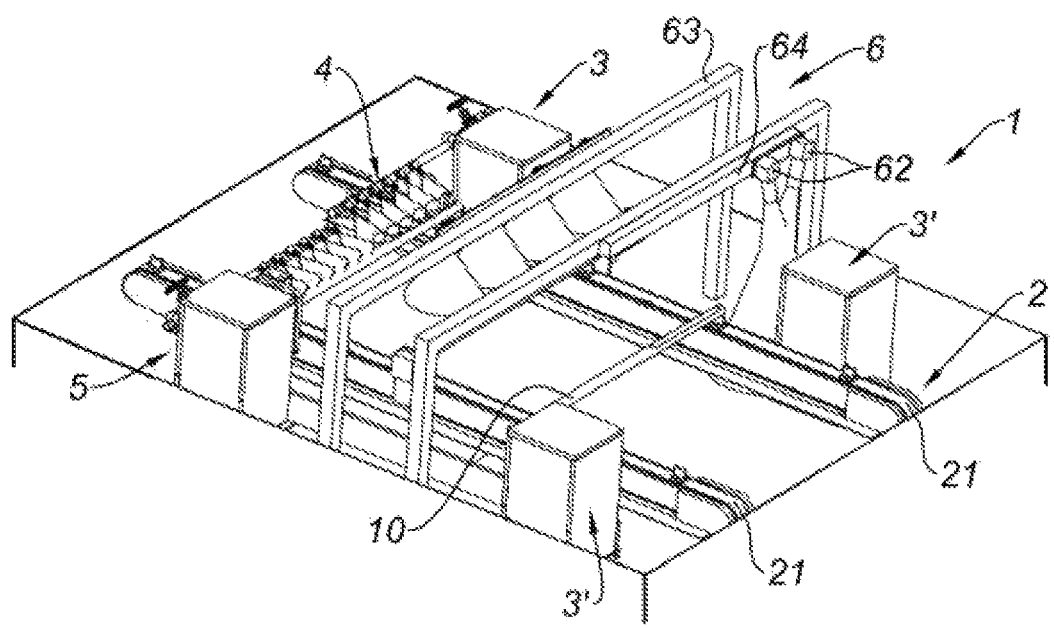

[Fig. 3]
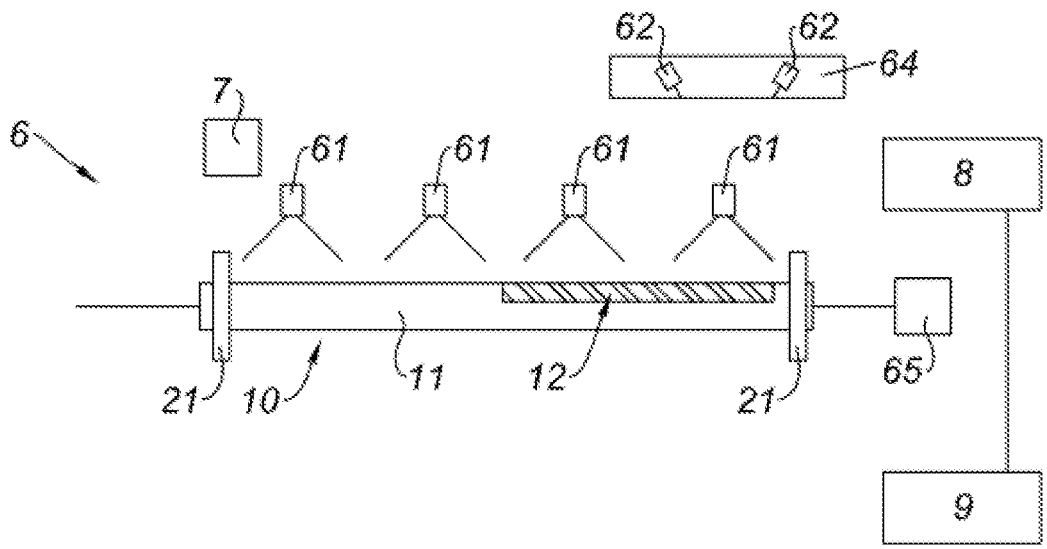
[Fig. 4]
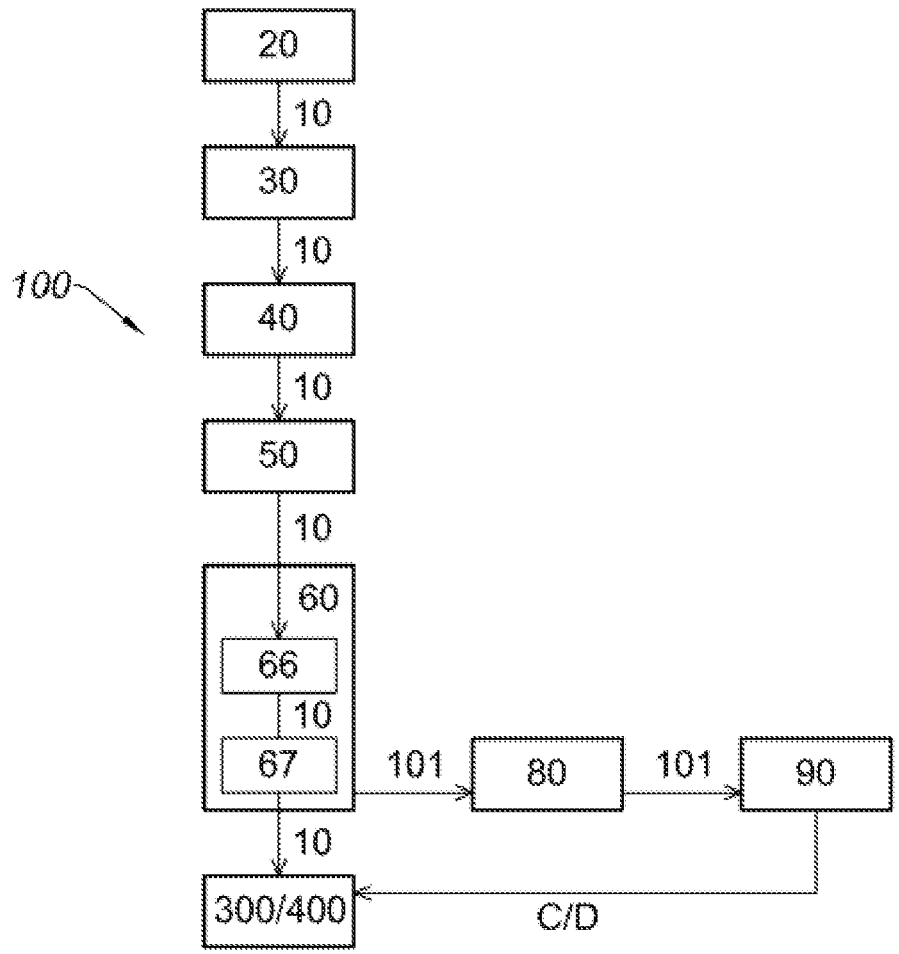

[Fig. 5]
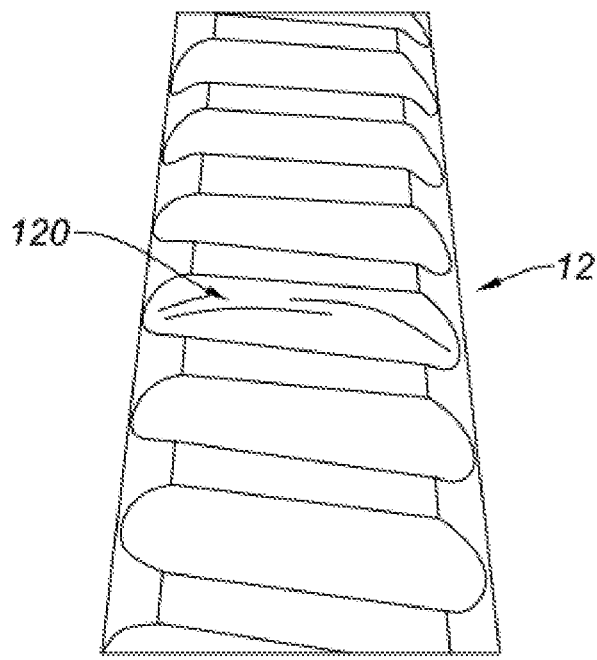
[Fig. 6]
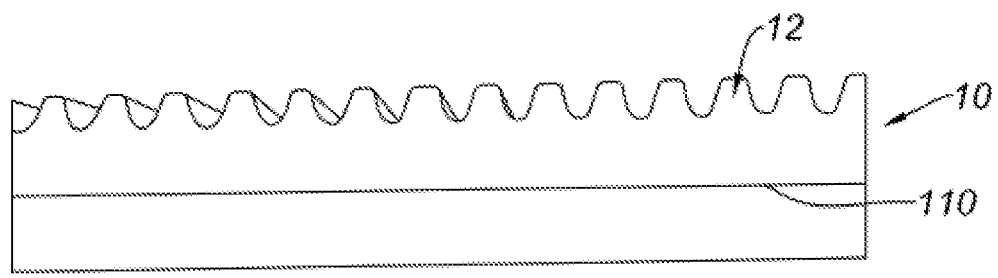

DEVICE TO CHECK A CONFORMITY OF A MECHANICAL PART OF A VEHICLE

The invention concerns the field of conformity checks carried out on a mechanical part of a vehicle and more particularly an installation allowing carrying out such a check and a method implementing such an installation.

Some mechanical parts present in a vehicle are crucial for the safety of the passengers of the vehicle. Thus, a manufacturer of such mechanical parts must ensure the conformity of these parts by means of a conformity check according to predefined requirements.

In particular, the conformity check allows identifying, locating and guaranteeing an absence of any metallurgical defect at the surface or beneath the surface resulting for example from a problem when making the material or from a surface treatment (at the inter-granular level) of the mechanical part.

Next, a conformity check carried out on a particular mechanical part: a rack of a steering system, will be considered as a non-limiting example. However, the conformity check may apply on other mechanical parts such as for example a drive pinion, a connecting rod, a camshaft, or a steering knuckle.

A rack is a mechanical part allowing maneuvering the wheels, that is to say allowing modifying an orientation angle of the wheels, via steering tie-rods.

In general, the rack is between 400 mm and 900 mm long. It is made of a ferromagnetic material. It comprises a body having a generally cylindrical shape with a diameter generally comprised between 22 mm and 34 mm and a toothing.

The toothing includes a plurality of teeth which extend according to an axis transverse to the axis of elongation of the rack. Each tooth is separated from the adjacent tooth by a tooth bottom land. Each tooth comprises a right tooth flank and a left tooth flank connected by a tooth top land.

During a manufacture of the rack, defects may be created. More specifically, the body may feature at least one «bar line». It consists of a linear defect extending according to the axis of elongation of the rack. Furthermore, the toothing may feature defects, subsequently called «cracks», whose dimensions are generally 1 mm long at minimum and 5 μm wide at minimum.

Thus, it is necessary to carry out a conformity check, that is to say a check-up of the absence of any defect, of each rack.

The conformity check of a rack includes the following steps of:
  Magnetizing the rack by means of a magnetizing device allowing diffusing a current in the rack;
  Spraying the rack with a revealing product by means of a spray device, the revealing product becoming fluorescent under an ultraviolet light;
  Checking up the rack by an operator;
  Demagnetizing.

Of course, this conformity check may be adapted to a mechanical part other than the rack.

The step of checking up the rack by the operator requires, on the one hand, the presence of the operator in a room illuminated with an UV light and, on the other hand, the user grasping the rack to be checked up so as to be able to observe the body and the toothing in order to detect any possible defects.

The drawback of this step lies in exposing the operator to an environment featuring a hazard to his health. Indeed, the operator works under UV light, close to a considerable magnetic field and in contact with the revealing product. Furthermore, depending on the weight of the mechanical part and on the production rate of the mechanical parts to be checked, the operator could develop musculoskeletal disorders.

The invention aims at overcoming all or part of the aforementioned drawbacks by providing an installation intended to enable a conformity check of a mechanical part of a vehicle, comprising at least one magnetizing device, and at least one device for spraying a revealing product, characterized in that the installation also comprises at least one device for generating at least one image by means of at least one image capture apparatus and at least one device for transmitting the at least one image towards an analysis unit.

For example, the image capture apparatus is a photographic apparatus or a camera. It allows taking fixed or movable images of the entirety of the mechanical part.

The transmission device sends the at least one image taken by the device for generating at least one image to the analysis unit. The transmission device remotely sends the at least one image.

Thus, the conformity check of the mechanical part may be carried out by the analysis unit by means of the images of the mechanical part. In this manner, the analysis unit, which may consist of an operator, is in contact with an image of the mechanical part and not with the mechanical part as a physical item. The analysis unit works remotely from the device for generating at least one image.

The analysis unit visualizes the defects on the images without coming into contact with the mechanical part.

According to a feature of the invention, the image capture apparatus is designed so as to take images under ultraviolet light and under white light.

According to a feature of the invention, the image capture apparatus is designed so as to take color images.

According to a feature of the invention, the image capture apparatus is designed so as to take black and white images.

According to a feature of the invention, the device for generating at least one image comprises a plurality of image capture apparatuses.

According to a feature of the invention, the at least one image capture apparatus takes a plurality of images of the rack.

According to a feature of the invention, the device for generating at least one image comprises a means for emitting an ultraviolet light and/or a means for emitting a white light.

According to a feature of the invention, the device for generating at least one image comprises a system for moving the mechanical part.

Moving of the mechanical part allows setting any face of the mechanical part opposite the at least one image capture apparatus.

In this manner, an image of each face, that is to say of an envelope, of the mechanical part may be taken step-by-step. Thus, longitudinal and transverse defects, that is to say bar lines or cracks when the mechanical part is a rack, may be detected over the entirety of the mechanical part.

According to a feature of the invention, the system for moving the rack comprises a system for rotating the mechanical part.

According to a feature of the invention, the system for moving the rack comprises a system for driving the mechanical part in translation.

Thus, it is possible to adapt the movement of the mechanical part so that an image of each face is taken.

When the mechanical part is a rack, an image capture apparatus positioned transversely to the axis of elongation of the rack will be successively placed opposite the entirety of the body and of the bottom lands of the teeth of the toothing. The image capture apparatus then takes images of an external surface of the rack, that is to say of its envelope.

In order to rotate the rack about its axis of elongation, the rotational drive system comprises at least one axis element in contact with an end of the rack.

According to a feature of the invention, the device for generating at least one image comprises a system for moving the at least one image capture apparatus.

Moving of the at least one image capture apparatus allows setting any face of the mechanical part opposite the at least one image capture apparatus. In this manner, an image of each face of the mechanical part may be taken step-by-step.

On a rack, the bar lines or the cracks may be detected both on the body and on the toothing.

According to a feature of the invention, the system for moving the at least one image capture apparatus comprises a system for driving the at least one image capture apparatus in translation.

Thus, the image capture apparatus takes images of the mechanical part along the length of the latter.

According to a feature of the invention, the mechanical part is a part of a steering system of the vehicle.

According to a feature of the invention, the mechanical part is a rack.

According to a feature of the invention, the device for generating at least one image comprises at least one first image capture apparatus positioned parallel with respect to the axis of elongation of the rack and at least one second image capture apparatus positioned so as to form an angle smaller than 90° with the axis of elongation of the rack.

According to a feature of the invention, at least one second image capture apparatus is positioned so as to form an angle substantially equal to 60° with the axis of elongation of the rack.

The at least one first image capture apparatus is intended to take images of the body of the rack in order to detect the bar lines.

Preferably, the at least one first image capture apparatus is fixed with respect to the installation.

The at least one first image capture apparatus operates in connection with the system for rotating the rack.

Preferably, the at least one first image capture apparatus is a so-called linear type image capture apparatus, that is to say an image sensor of said image capture apparatus has a dimension close to 1*n pixels, with n≥1. Thus, a linear image taken by the linear image capture apparatus has a dimension close to 1*n pixels, with A linear image capture apparatus allows acquiring an image having a homogeneous brightness.

According to a feature of the invention, the device for generating at least one image comprises a plurality of first image capture apparatuses.

The at least second image capture apparatus is intended to take images of the toothing of the rack and more specifically of a right and left tooth flank of each tooth as well as the bottom land of the teeth in order to detect cracks.

Preferably, the at least one second image capture apparatus is movable in translation according to the axis of elongation of the rack relative to the rack, that is to say the at least one second apparatus operates in connection with the translational drive system. Thus, the at least second image capture apparatus takes each tooth flank in its entirety without any portion of the tooth flank being hidden by the tooth flank of the previous tooth by a parallax phenomenon.

Preferably, the at least second image capture apparatus is a so-called matrix type image capture apparatus, that is to say an image sensor of said apparatus captures the image according to a matrix having a m*n pixels dimension, with n>1 and m>1.

According to a feature of the invention, the device for generating at least one image comprises at least two second image capture apparatuses positioned symmetrically with respect to the axis transverse to the axis of elongation of the rack.

In this manner, it is possible to simultaneously take images of the right tooth flank and of the left tooth flank of the same tooth.

According to a feature of the invention, the installation comprises a device for drying the revealing product.

In this manner, the mechanical part is not shiny in the taken images.

According to a feature of the invention, the drying device is designed so as to blow air.

According to a feature of the invention, the drying device is designed so as to heat the rack by means of a current.

According to a feature of the invention, the installation comprises at least one conveyor.

The invention also relates to a method for checking the conformity of a mechanical part of a vehicle, implementing an installation according to any one of the preceding claims, comprising:

A step of depositing a mechanical part over a conveyor;
A step of magnetizing the mechanical part by means of the magnetizing device;
A step of spraying the revealing product over the mechanical part by means of the spray device;
A step of demagnetizing the mechanical part by means of the demagnetizing device;
Characterized in that the method also comprises:
A step of capturing an image of the mechanical part by means of the device for generating at least one image, the image capturing step generating at least one image of the mechanical part;
A step of transmitting the at least one image of the mechanical part on an analysis unit by means of the transmission device;
An analysis step by the analysis unit determining a conformity of the mechanical part.

The step of deposing the mechanical part may be carried out by an operator or by a machine.

The step of capturing an image of the mechanical part allows taking at least one image of the mechanical part.

The image capturing step transmits the at least one image to the transmission device and the transmission device transmits the at least one image of the mechanical part on an analysis unit.

The analysis step may comprise a processing of the at least one image received by the analysis unit. For example, the analysis unit may combine a plurality of images so as to create a first image representing a first face of the mechanical part and a second image representing a second face of the mechanical part.

Afterwards, the analysis unit may display said image on a screen for example so that an operator visualizes said image and decides on the conformity of the mechanical part.

The analysis unit may carry out a processing of the at least one image so as to detect, by means of an image recognition principle, the presence of defects on the rack. The detection of the defects is then carried out automatically.

According to a feature of the invention, the image capturing step comprises:

A bar image capturing phase in which the rack performs a step-by-step rotation about the axis of elongation of the rack;

A toothing image capturing phase in which the at least one image capture apparatus performs a translation according to the axis of elongation of the rack.

The bar image capturing phase requires the system for rotating the rack.

The bar image capturing phase allows taking at least one image with a homogeneous brightness over the entirety of the body of the rack.

According to a feature of the invention, the bar image capturing phase comprises the capture of at least one image under white light and the capture of at least one image under ultraviolet light.

The toothing image capturing phases requires the translational drive system.

The toothing image capturing phase allows taking an image with a homogeneous brightness of the entirety of the toothing of the rack.

According to a feature of the invention, the toothing image capturing phase comprises the capture of at least one image under white light and the capture of at least one image under ultraviolet light.

According to a feature of the invention, the conformity check method comprises a drying step after the spraying step and before the image capturing step.

Thus, the revealing product is dry during the image capturing step and does not create any shiny area.

According to a feature of the invention, the analysis step carries out a phase of creating a first image under white light and under ultraviolet light and a second image under white light and under ultraviolet light, then a phase of subtracting the first image under white light, respectively the second image under white light, with the first image under ultraviolet light, respectively the second image under ultraviolet light.

In this manner, the analysis step increases the contrast of the defects to the detriment of the contrast related to the geometric variations.

The invention will be better understood, thanks to the description hereinafter, which relates to an embodiment according to the present invention, provided as a non-limiting example and explained with reference to the appended schematic drawings, in which:

FIG. 1 is a view according to a first angle of an installation according to the invention;

FIG. 2 is a view according to a second angle of the installation of FIG. 1;

FIG. 3 is a schematic representation of a device for generating at least one image;

FIG. 4 is a block diagram of a method according to the invention;

FIG. 5 is a color image of a toothing of a rack taken during an image capturing step according to the invention;

FIG. 6 is a black and white image of a portion of a developed pattern of a body of a rack.

FIGS. 1 and 2 illustrate an installation 1 according to the invention. The installation 1 comprises a conveyor 2 provided with two conveyor belts 21. Said conveyor 2 comprises «V»-like shaped supports intended to receive a rack 10 for a steering system of a vehicle. The rack 10 is intended to be positioned transversely on the conveyor belts 21. One conveyor belt 21 is movable relative to the other one. Thus, a spacing between the two conveyor belts 21 is adjusted according to a length of said rack 10.

The installation 1 comprises a magnetizing device 3. The magnetizing device 3 diffuses a current in the rack 10 so as to magnetize it.

The installation 1 comprises a device 4 for spraying a revealing product. The revealing product is a product that is fluorescent under an ultraviolet light. The revealing product comprises an aqueous base.

The installation 1 comprises a device 5 for drying the revealing product. The drying device 5 induces a current in the rack 10 so as to increase its temperature and thus dry the revealing product.

The installation 1 also comprises a device for generating at least one image 6. FIG. 3 is a schematic representation of the device for generating at least one image 6.

Said device for generating at least one image 6 comprises 4 first image capture apparatuses 61 positioned parallel with respect to the axis of elongation of the rack 10. The first image capture apparatuses 61 consist of photographic cameras. The first image capture apparatuses 61 are fixed with respect to the installation 1, more specifically, they are fastened on a support 63 extending along the axis of elongation of the rack 10. The first image capture apparatuses 61 are image capture apparatuses which may consist of so-called linear or matrix type image capture apparatuses. Each of the first image capture apparatuses 61 take a 40° image, which can be configured from 20° to 120°. The first image capture apparatuses 61 take black and white or color images. The first image capture apparatuses 61 operate under an ultraviolet light emitted by an ultraviolet lamp 7.

Said device for generating at least one image 6 also comprises 2 second image capture apparatuses 62 positioned so as to form an angle smaller than 90° with respect to the axis of elongation of the rack 10. The 2 second image capture apparatuses 62 are photographic cameras. The 2 second image capture apparatuses 62 are positioned symmetrically with respect to the axis transverse to the axis of elongation of the rack 10. The second image capture apparatuses 62 are fastened on a system for moving the 2 second image capture apparatuses 62, and more specifically on a system 64 for driving the 2 second image capture apparatuses 62 in translation according to the direction of elongation of the rack 10. The second image capture apparatuses 62 are so-called matrix type image capture apparatuses. The second image capture apparatuses 62 take black and white or color images. The second image capture apparatuses 62 operate under an ultraviolet light emitted by the ultraviolet lamp 7.

Said device for generating at least one image 6 further comprises a system for moving the rack 10. The system for moving the rack 10 comprises a system 65 for rotating the rack 10 about the axis of elongation of the rack 10. In order to rotate the rack 10 about its axis of elongation, the rotational drive system 65 comprises an axis element in contact with an end of the rack 10.

Said device for generating at least one image 6 also comprises a device 8 for transmitting the at least one image on an analysis unit 9.

The analysis unit 9 is a processor connected to a screen.

The installation 1 also comprises a device 3' for demagnetizing the rack 10 allowing demagnetizing said rack.

FIG. 4 is a block diagram of a check method 100 according to the invention.

The method 100 for checking the conformity of the rack 10 implements an installation 1.

The check method 100 comprises a step 20 of depositing the rack 10 over the conveyor 2. The depositing step 20 is carried out by an operator or an automatic machine. The operator or said automatic machine positions each end of the rack on the supports of the conveyor belts 21.

The conveyor 2 brings the rack 10 up to the magnetizing device 3 which carries out a step 30 of magnetizing the rack 10.

Afterwards, the rack 10 is sprayed by means of the spray device 4 with the revealing product during a spraying step 40.

The drying device 5 induces a current in the rack 10 so as to increase its temperature and thus dry the revealing product during a drying step 50. Thus, the revealing product is dry during the image capturing step and does not create any shiny area.

The conveyor 2 brings the rack 10 up to the device for generating at least one image 6 which carries out a step 60 of capturing an image of the rack 10. The image capturing step 60 generates a plurality of images 101 of the rack 10.

More specifically, the image capturing step 60 comprises a bar image capturing phase 66 in which the device 65 for rotating the rack 10 performs a step-by-step rotation of the rack 10 by a predetermined angle and each of the first image capture apparatuses 61 take an image at each step of a body 11 of the rack 10.

In other words, at the first step «n», each of the first image capture apparatuses 61 takes an image of a portion of the line «m» of the rack 10. By line of the rack 10, it should be understood an area extending over the entire length of the rack, of the surface of the rack 10 opposite the first image capture apparatuses 61. An assembly of the 4 portions of the line «m» forms an image of the line «m» of the rack 10.

At the next step «n+1», the rack has pivoted about its axis of elongation by a predetermined angle. The line «m+1» is then opposite the first image capture apparatuses 61. Each of the first image capture apparatuses 61 takes an image of a portion of the line «m+1» of the rack 10. An assembly of the 4 portions of the line «m+1» forms an image of the line «m+1» of the rack 10.

Once the rack has performed a complete rotation about its axis of elongation, that is to say when the line «m» is again opposite the first image capture apparatuses 61, an image of all of the lines of the rack has been carried out.

Afterwards, the image capturing step 60 comprises a toothing image capturing phase 67 in which each of the 2 second image capture apparatuses 62 takes images of the toothing 12 of the rack.

More specifically, one of the second image capture apparatuses 62 is oriented so as to be able to take an image of a right tooth flank of at least one tooth of the toothing whereas the other image capture apparatus 62 is oriented so as to be able to take an image of a left tooth flank of the at least one tooth.

A field depth of the second image capture apparatuses 62 allows taking 3 tooth flanks of 3 successive teeth on the same image.

Thus, the rack 10 is oriented so as to set the toothing opposite the second image capture apparatuses 62. The second image capture apparatuses 62 take an image of the right and left tooth flanks of the first three teeth «d». Then, the second image capture apparatuses 62 are translated by means of the translational drive system 64 by a predetermined distance. The predetermined distance depends on the field depth of the second image capture apparatuses. The second image capture apparatuses 62 take an image of the right and left tooth flanks of the next three teeth «d+1». In this manner, an image of the right and left tooth flanks of all of the teeth of the toothing 12 is taken.

FIG. 5 represents a color image of the right tooth flanks of the toothing 12 of the rack 10. In said image, taken under an ultraviolet light, the revealing product that enters into the cracks 120 appears in fluorescent green.

The images 101 taken by the device for generating at least one image 6 are transmitted during a step 80 of transmitting the at least one image of the rack by the transmission device 8 to the analysis unit 9.

The analysis unit carries out a processing of the images 101. More specifically, in order to facilitate the detection of bar line type defects, the analysis unit 9 assembles the images of each line of the rack 10 taken during the bar image capturing phase 66. In this manner, the analysis unit creates from a multitude of line image, a first image representing a developed pattern of the body 11 of the rack 10.

FIG. 6 represents a portion of a first black and white image of a portion of the rack featuring a bar line 110. In said image, a bar line type defect 110 is present and appears in white.

Furthermore, in order to facilitate the detection of crack type defects, the analysis unit 9 assembles the images of the right tooth flanks and then of the left tooth flanks of all of the teeth of the toothing 12 taken during the toothing image capturing phase 67. In this manner, the analysis unit creates from a multitude of images, two second images representing a developed pattern of the toothing 12 of the rack 10.

Using the analysis unit which displays the images 101 of the rack 10 on the screen, an operator determines the conformity of the rack 10 during an analysis step 90. If the rack 10 does not have bar line or crack type defects, the rack is considered compliant. Then, a conformity signal C is emitted by the analysis unit. If the rack 10 has bar line or crack type defects, the rack is considered non-compliant. Then, a defect signal D is emitted by the analysis unit.

Upon the conformity signal C, the conveyor 2 then brings the rack 10 up to the demagnetizing device 3' which carries out a step 300 of demagnetizing the rack 10.

Upon the defect signal D, the rack is evacuated by an operator or an automaton who/which removes said rack off the conveyor 2 during an evacuation step 400.

In this manner, the installation 1 enables a quality check of the rack 10.

Of course, the invention is not limited to the embodiments described and represented in the appended figures. Modifications are still possible, in particular with regards to the constitution of the various elements or by substitution with technical equivalents, yet without departing from the scope of the invention.

The invention claimed is:

1. An installation intended to enable a conformity check of a mechanical part of a vehicle, comprising:
    at least one magnetizing device,
    at least one device for spraying a revealing product,
    at least one device for generating at least one image by means of at least one image capture apparatus, and
    at least one device for transmitting the at least one image towards an analysis unit,
    wherein the mechanical part is a rack of a steering system of the vehicle,
    wherein the device for generating at least one image comprises at least one first image capture apparatus positioned parallel with respect to an axis of elongation of the rack to image the rack in a direction perpendicular to the axis of elongation of the rack, and at least one second image capture apparatus positioned so as to image the rack in a direction not perpendicular to the axis of elongation of the rack, and wherein the at least one second image capture apparatus comprises at least two image capture apparatuses, each positioned so as to image the rack in a direction not perpendicular to the axis of elongation of the rack and in directions at symmetrical angles with respect to an axis transverse to the axis of elongation of the rack.

2. The installation according to claim 1, wherein the device for generating at least one image comprises a system for moving the mechanical part.

3. The installation according to claim 2, wherein the system for moving the mechanical part comprises a system for rotating the mechanical part.

4. The installation according to claim 1, wherein the device for generating at least one image comprises a system for moving the at least one image capture apparatus.

5. The installation according to claim 4, wherein the system for moving the at least one image capture apparatus comprises a system for driving the at least one image capture apparatus in translation.

6. The installation according to claim 1, comprising a device for drying the revealing product.

7. A method for checking the conformity of a mechanical part of a vehicle, implementing an installation according to claim 1, comprising:
   depositing the mechanical part over a conveyor;
   magnetizing the mechanical part by means of the magnetizing device;
   spraying the revealing product over the mechanical part by means of the spray device;
   demagnetizing the mechanical part by means of the demagnetizing device;
   wherein the method also comprises:
   capturing an image of the mechanical part by means of the device for generating at least one image, the image capturing step generating at least one image of the mechanical part;
   transmitting the at least one image of the mechanical part on an analysis unit by means of the transmission device; and
   using the analysis unit to determine a conformity of the mechanical part.

\* \* \* \* \*